(12) United States Patent
Flisar et al.

(10) Patent No.: US 11,754,201 B2
(45) Date of Patent: Sep. 12, 2023

(54) TUBING RETAINER

(71) Applicant: Pall Corporation, Port Washington, NY (US)

(72) Inventors: Robert Flisar, Dreieich (DE); Jens Bretschneider, Dreieich (DE)

(73) Assignee: CYTIVA US LLC, Marlborough, MA (US)

( * ) Notice: Subject to any disclaimer, the term of this patent is extended or adjusted under 35 U.S.C. 154(b) by 184 days.

(21) Appl. No.: 17/387,487

(22) Filed: Jul. 28, 2021

(65) Prior Publication Data

US 2023/0030395 A1 Feb. 2, 2023

(51) Int. Cl.
*F16L 3/00* (2006.01)
*F16L 3/02* (2006.01)
*G01D 11/24* (2006.01)

(52) U.S. Cl.
CPC .............. *F16L 3/02* (2013.01); *G01D 11/245* (2013.01)

(58) Field of Classification Search
None
See application file for complete search history.

(56) References Cited

U.S. PATENT DOCUMENTS

| | | | |
|---|---|---|---|
| 3,747,166 A | 7/1973 | Eross | |
| 4,062,574 A * | 12/1977 | Scholin | F16L 37/091 285/382 |
| 4,437,691 A * | 3/1984 | Laney | F16L 25/0036 285/55 |
| 4,539,849 A * | 9/1985 | Pike | A61B 5/0215 73/756 |
| 5,178,354 A | 1/1993 | Engvall | |
| 5,694,972 A | 12/1997 | King | |
| 9,329,061 B2 | 5/2016 | Vanderaa | |
| 9,435,630 B2 | 9/2016 | Storrie et al. | |
| 2006/0006651 A1* | 1/2006 | Watanabe | F16L 25/0036 285/903 |
| 2015/0107379 A1* | 4/2015 | Rose | G01F 15/18 73/866.5 |
| 2015/0211669 A1 | 7/2015 | Houtte | |
| 2019/0145547 A1* | 5/2019 | Ball | F16B 7/185 248/558 |
| 2021/0301846 A1 | 9/2021 | Lin | |
| 2022/0178479 A1* | 6/2022 | Larson | F16L 19/065 |

FOREIGN PATENT DOCUMENTS

| | | |
|---|---|---|
| AU | 468111 B2 | 1/1976 |
| CN | 202074123 U | 12/2011 |
| EP | 3 822 610 A1 | 5/2021 |
| FR | 2 414 165 A | 8/1979 |

(Continued)

OTHER PUBLICATIONS

European Patent Office, Extended European Search Report issued in counterpart European Patent Application No. 22180996.5, dated Dec. 19, 2022.

(Continued)

*Primary Examiner* — Steven M Marsh
(74) *Attorney, Agent, or Firm* — LEYDIG, VOIT & MAYER, LTD.

(57) ABSTRACT

Tubing retainers use with sensors, sensing systems including the tubing retainers, and methods of using the tubing retainers and sensing systems are disclosed.

20 Claims, 4 Drawing Sheets

(56) References Cited

FOREIGN PATENT DOCUMENTS

| | | | |
|---|---|---|---|
| GB | 2 276 925 | A | 10/1994 |
| JP | 3006378 | U | 1/1995 |
| JP | 2014-170933 | A | 9/2014 |
| JP | 3232174 | U | 5/2021 |
| JP | 2021-91495 | A | 6/2021 |
| JP | 2022-183941 | A | 12/2022 |
| KR | 10-2012-0092330 | A | 8/2012 |
| WO | WO2020/246162 | A1 | 12/2020 |

OTHER PUBLICATIONS

Singapore Intellectual Property Office, Search Report issued in counterpart Singapore Patent Application No. 10202250450B, dated Apr. 20, 2023.
Japanese Patent Office, Office Action issued in counterpart Japanese Patent Application No. 2022-103758, dated Jul. 18, 2023.

* cited by examiner

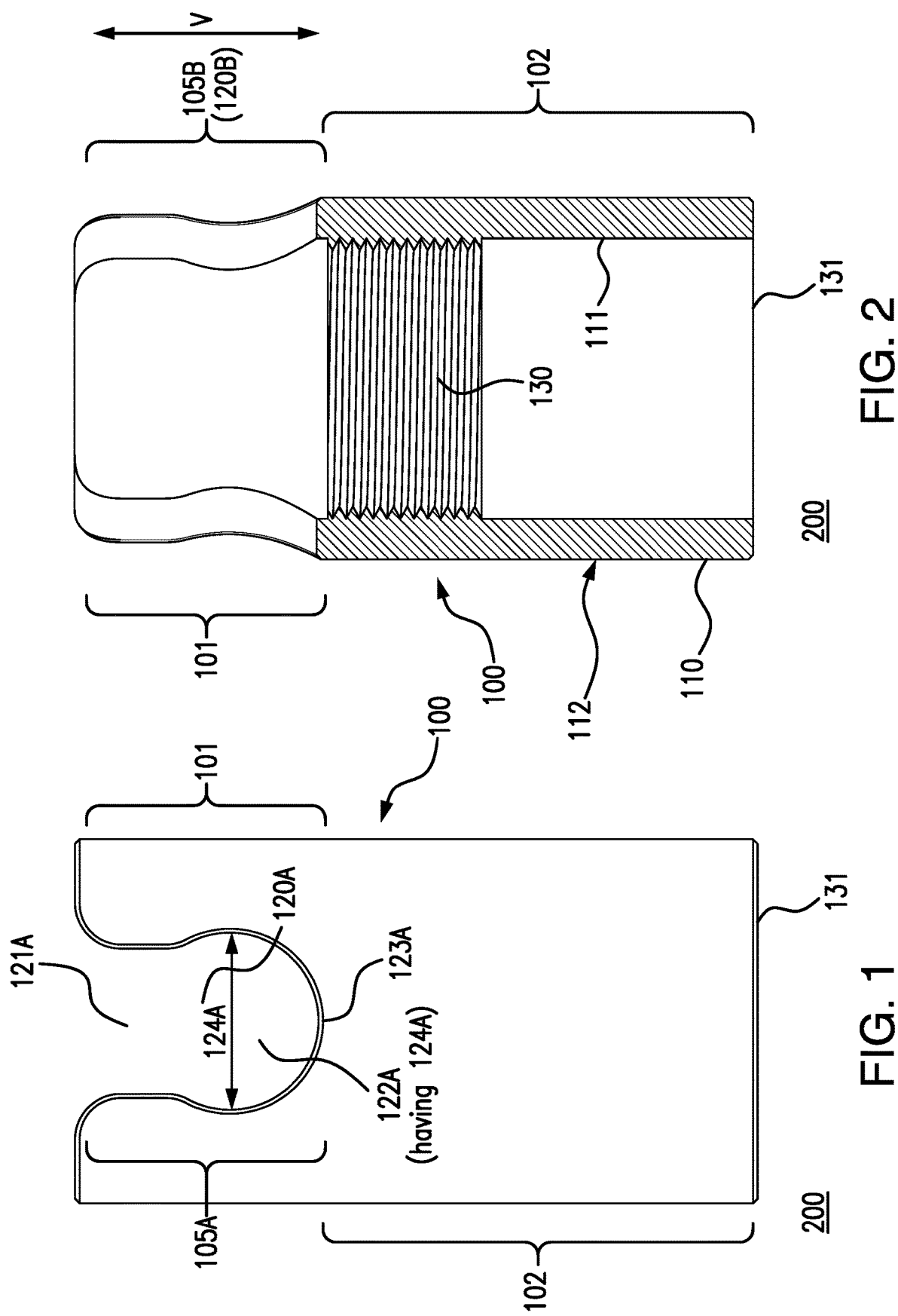

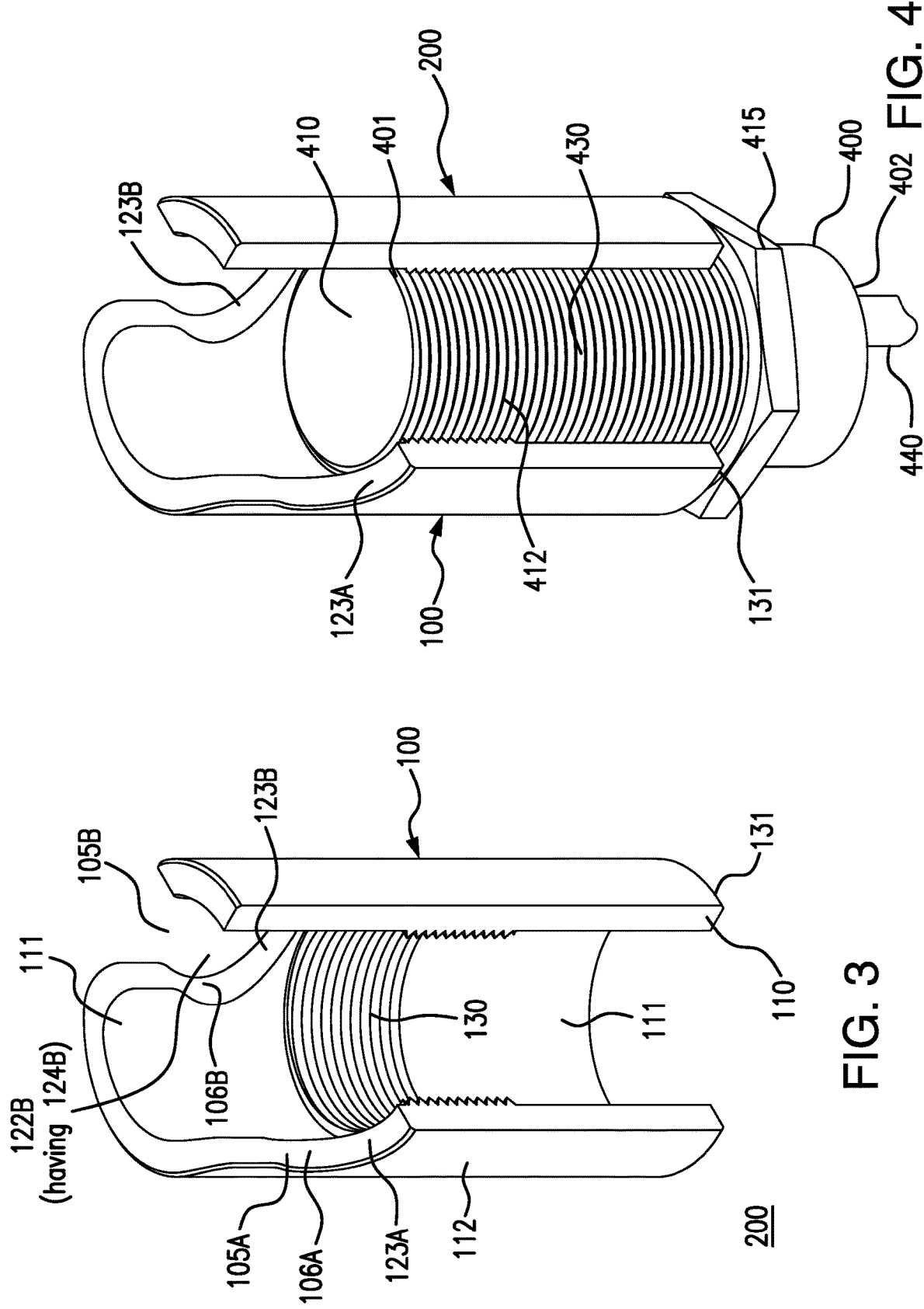

TUBING RETAINER

BACKGROUND OF THE INVENTION

A variety of tubing retainers include a component that are threaded into the retainer body to press tubing against, or near, a sensor, for efficient sensing a parameter of interest in a fluid in the tubing. However, there is a need for improved tubing retainers.

The present invention provides for ameliorating at least some of the disadvantages of the prior art. These and other advantages of the present invention will be apparent from the description as set forth below.

BRIEF SUMMARY OF THE INVENTION

An aspect of the invention provides a tubing retainer for use with a sensor, comprising (a) a hollow polymeric shaft having a first end, a second end, a side wall having a cylindrical inner surface and an outer surface, and a vertical axis; (i) the first end having cut outs through opposing portions of the side wall, the cut outs forming first and second slots in the opposing portions of the side wall, the first and second slots collectively arranged to receive cylindrical tubing therein, the first and second slots each having a narrower portion at the first end for initially receiving the cylindrical tubing, and a wider portion below the narrower portion, the wider portion providing a closed end of the slot, wherein the wider portion has an inner diameter arranged to retain the cylindrical tubing without significantly compressing the cylindrical tubing; (ii) the second end having threads on the inner surface, and a flat base perpendicular to the vertical axis.

In another aspect, a sensing system is provided, comprising an aspect of the tubing retainer; cylindrical tubing retained in the first end of the tubing retainer; and, a sensor having an upper end and a lower end, the sensor having an outer surface including threads engageable with the threads on the inner surface of the second end of the tubing retainer.

In another aspect, a method of retaining tubing is provided, the method comprising placing cylindrical tubing in the slots in the first end of an aspect of the tubing retainer, and sliding the tubing through the narrower portions into the wider portions. In a preferred aspect, the method also includes threadably engaging a sensor in the second end of the aspect of the tubing retainer.

BRIEF DESCRIPTION OF THE SEVERAL VIEWS OF THE DRAWING(S)

FIG. 1 is a side view of a tubing retainer according to an aspect of the invention, having a first end and a second end, also showing a slot through a portion of the side wall in the first end of the retainer.

FIG. 2 is a cross-sectional view of the tubing retainer along line A-A of FIG. 1, also showing threads on the inner surface of the second end of the tubing retainer.

FIG. 3 is a perspective partial cut-away view of the tubing retainer shown in FIG. 1, wherein the tubing retainer has been partially rotated from the view shown in FIG. 1.

FIG. 4 shows a sensor having an upper end having a sensor face, wherein at least the upper end has an outer surface with threads threadably engaged in the threads in the second end of the tubing retainer shown in FIG. 3.

DETAILED DESCRIPTION OF THE INVENTION

Figure 5:
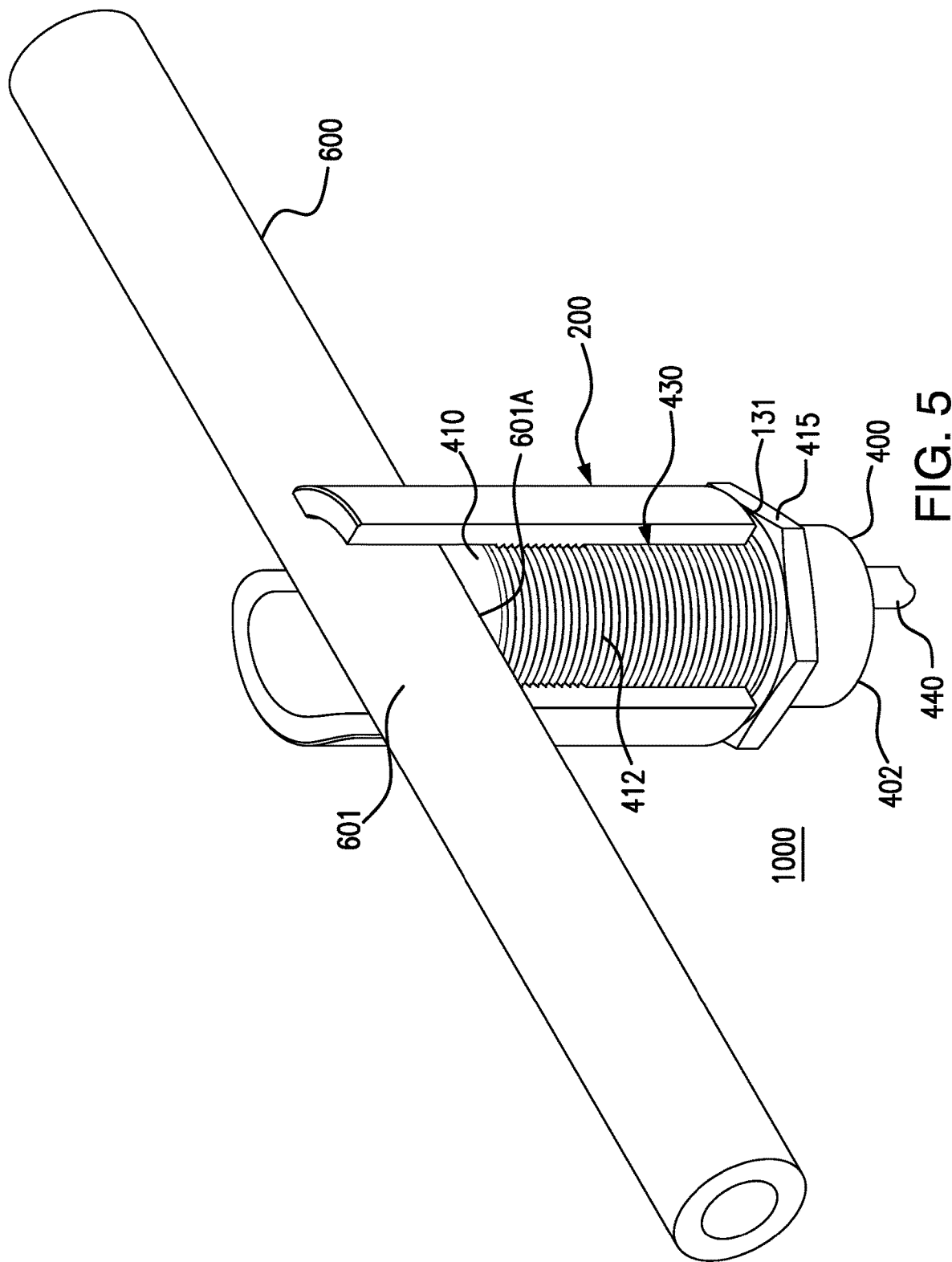
FIG. 5 is a perspective view of a sensing system according to another aspect of the invention, showing the sensor threadably engaged in the second end of the tubing retainer as shown in FIG. 4, with cylindrical tubing retained in the first end of the tubing retainer, wherein a portion of the outer surface of the cylindrical tubing directly opposes the face of the sensor.

In accordance with an aspect of the invention, a tubing retainer for use with a sensor comprises (a) a hollow polymeric shaft having a first end, a second end, a side wall having a cylindrical inner surface and an outer surface, and a vertical axis; (i) the first end having cut outs through opposing portions of the side wall, the cut outs forming first and second slots in the opposing portions of the side wall, the first and second slots collectively arranged to receive cylindrical tubing therein, the first and second slots each having a narrower portion at the first end for initially receiving the cylindrical tubing, and a wider portion below the narrower portion, the wider portion providing a closed end of the slot, wherein the wider portion has an inner diameter arranged to retain the cylindrical tubing without significantly compressing the cylindrical tubing; (ii) the second end having threads on the inner surface, and a flat base perpendicular to the vertical axis.

In another aspect, a sensing system is provided, comprising an aspect of the tubing retainer; cylindrical tubing retained in the first end of the tubing retainer; and, a sensor having an upper end and a lower end, the sensor having an outer surface including threads engageable with the threads on the inner surface of the second end of the tubing retainer.

In another aspect, a method of retaining tubing is provided, the method comprising placing cylindrical tubing in a tubing retainer for use with a sensor, the tubing retainer comprising a hollow polymeric shaft having a first end, a second end, a side wall having a cylindrical inner surface and an outer surface, and a vertical axis; (i) the first end having cut outs through opposing portions of the side wall, the cut outs forming first and second slots in the opposing portions of the side wall, the first and second slots collectively arranged to receive cylindrical tubing therein, the first and second slots each having a narrower portion at the first end for initially receiving the cylindrical tubing, and a wider portion below the narrower portion, the wider portion providing a closed end of the slot, wherein the wider portion has an inner diameter arranged to retain the cylindrical tubing without significantly compressing the cylindrical tubing; (ii) the second end having threads on the inner surface, and a flat base perpendicular to the vertical axis; and, placing cylindrical tubing in the slots in the first end of the tubing retainer, and sliding the cylindrical tubing through the narrower portions into the wider portions. In an aspect, the method also includes threadably engaging a sensor in the second end of the aspect of the tubing retainer.

Advantageously, particularly for applications involving single use tubing, that can require frequent installation and removal, and, when used in clean room by operators having double gloved hands, the tubing can be easily engaged in the tubing retainer, without an additional attachment or an element such as a lid. The distance between the tubing and the sensor is controlled, remaining the same, allowing consistent valid measurements to be carried out. Additionally, threads are not exposed in the clean room, and thread jamming during installation in the clean room can be avoided. Aspects of the tubing retainer can be easily manufactured.

Each of the components of the invention will now be described in more detail below, wherein like components have like reference numbers.

As shown in FIGS. 1-3 (FIG. 3 showing the tubing retainer rotated 45° in both the horizontal and rotational axes as compared to FIG. 1), in one aspect, a tubing retainer 200 for use with a sensor, comprises a hollow polymeric shaft 100 having a first end 101, a second end 102 having a flat base 103, a side wall 110 having a cylindrical inner surface 111 and an outer surface 112, and a vertical axis "V"; the first end having corresponding cut outs 105A, 105B through corresponding opposing portions 106A, 106B of the side wall, the cut outs forming first and second slots 120A, 120B in the opposing portions of the side wall, the first and second slots collectively arranged to receive cylindrical tubing 600 (shown in FIGS. 5 and 6) therein, the first and second slots each having a narrower portion 121A, 121B at the first end for initially receiving the cylindrical tubing, and a wider portion 122A, 122B below the narrower portion, the wider portions providing closed ends 123A, 123B of the slot, wherein the wider portion has an inner diameter 124A, 124B arranged to retain the cylindrical tubing without significantly compressing the cylindrical tubing; the second end 102 having threads 130 on the cylindrical inner surface 111, and a flat base 131 perpendicular to the vertical axis.

The second end 102 of the tubing retainer has threads 130 on at least of portion of the inner surface 111, extending toward the first end, approaching, if not reaching, the level of the closed ends of the slots. While FIGS. 2-6 show the threads 130 extending over a portion of the inner surface of the second end, the threads can extend downwardly, toward, and in some aspects reaching, the flat base FIG. 4 shows a sensor 400 having an upper end 401 including a face 410, and a lower end 402 (and a cable 440 extending from the lower end), the sensor having an outer surface 412 including threads 430 engageable with the threads 130 on the inner surface of the second end of the tubing retainer.

As noted above and as shown in FIGS. 4-6, the threads 130 on the inner surface of the second end 102 are configured to engage with threads 430 on the outer surface 412 of a sensor 400, wherein when cylindrical tubing 600 is retained in the first end 101 of the tubing retainer 200 and the sensor 400 is threadably engaged in the second end 102 of the tubing retainer, a portion 601 of the cylindrical tubing is aligned with the upper end 401 of the sensor, such that a lower portion 601A of the tubing opposes (faces) the face 410 of the sensor.

The inner diameter 124A, 124B can be equal to or slightly less than the outside diameter 624 of the tubing 600 to hold the tubing in position. For example, the inner diameters of the wider portions can be about 5% smaller, or about 2% smaller than the outer diameter of the cylindrical tubing. Illustratively, if the outside diameter of the tubing is 90 mm, the inside diameters of the wider portions can be 90 mm or in the range of 88.2 mm to 88.8 mm. As will be recognized by one of skill in the art, the sizes of the slots, inner diameters, and wider portions can be selected for use with a variety of cylindrical tubing having different outside diameters.

In some aspects, the lower portion 601A of the outer surface of the tubing 600 facing the sensor 400 contacts the face 410 of the sensor 400; in other aspects, there is a gap (e.g., about 2 cm or less; in some aspects, about 1 cm or less, for example, in the range of 0.2 cm to 0.6 cm) between the outer surface of the tubing (the lower portion 601A of the tubing retained in the closed end of the slot facing the sensor) and the face of the sensor. For example, the upper end 401 of the sensor can be screwed into the second end 102 of the retainer 200 until the desired contact or gap is achieved, or the threads in the second end of the retainer can end a desired distance from the bottom of the slots.

Figure 6:
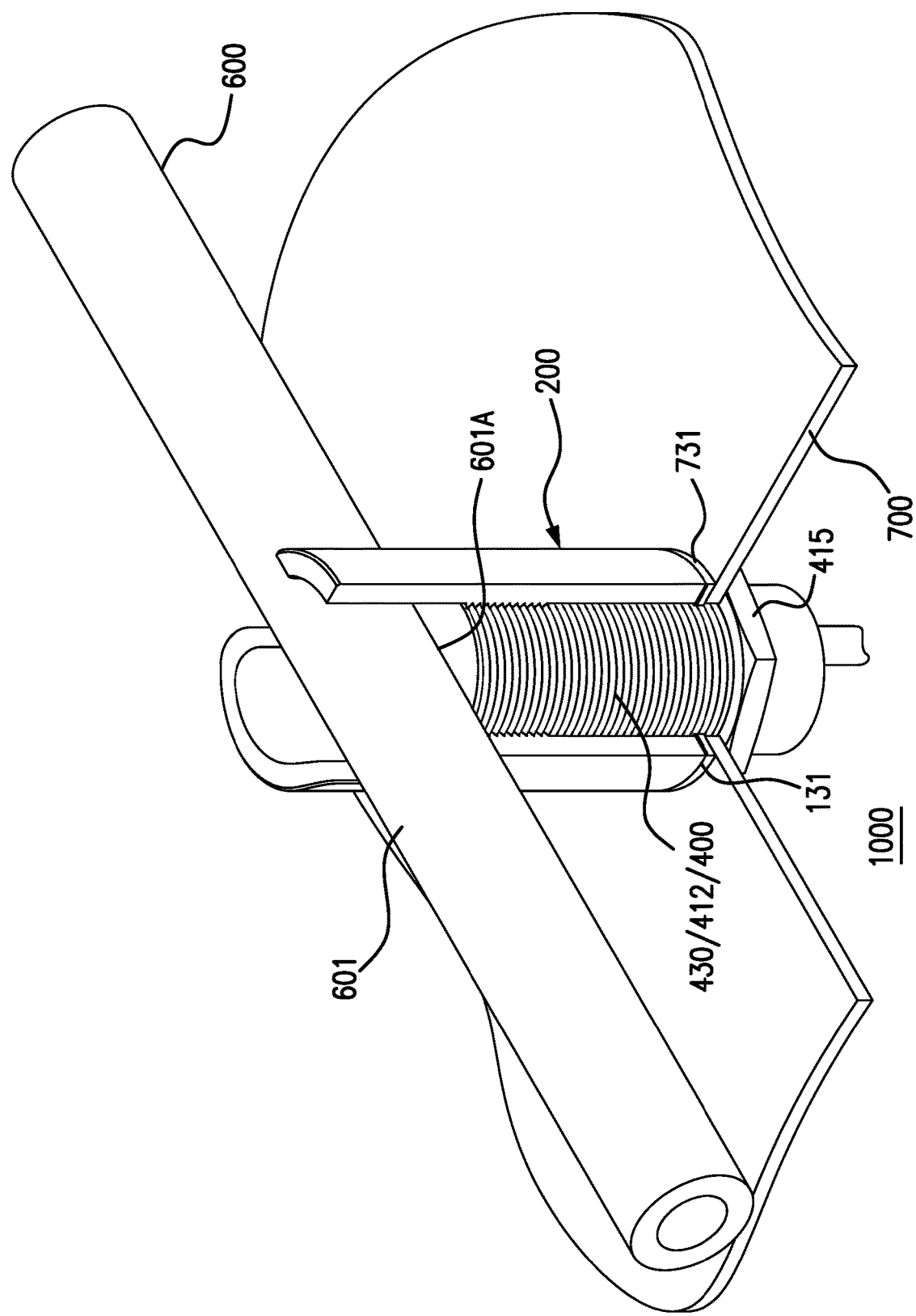
FIG. 6 is a perspective view of the sensing system as shown in FIG. 5 attached to a mounting plate.

In another aspect, FIGS. 5 and 6 show an exemplary sensing system 1000 comprising an aspect of the tubing retainer 200; cylindrical tubing 600 retained in the first end 100 of the tubing retainer; and, the sensor 400 having an upper end 401 and a lower end 402, the sensor having an outer surface 412 including threads 430 engageable with (shown engaged with) the threads 130 on the inner surface of the second end of the tubing retainer.

A variety of sensors (which are non-invasive) are suitable for use in aspects of the invention, including magnetic (capacitive), ultrasonic, and optical, wherein at least the upper end of the sensor (the portion of the sensor inserted into the second (lower) end of the tubing retainer) has a cylindrical shape such that the external threads on the sensor are readily engageable with the threads on the inner surface of the second end of the tubing retainer.

In some aspects, as illustrated in FIG. 6, the upper end of the sensor passes through a mounting plate 700 and a threaded nut 415 can assist in retaining the sensor in position during use. If desired, a gasket can be arranged between the upper surface of the nut and the base of the retainer. In the aspect illustrated in FIG. 6, gasket 731 is arranged between the base of the retainer and the top surface of the mounting plate.

The shaft can be fabricated from any suitable polymeric material, including any suitable thermoplastic polymeric material. Suitable polymers include, for example, silicon, or an acrylic, polypropylene, polystyrene, or a polycarbonated resin.

Aspects of the invention are suitable for use in a variety of fluid processing systems, for example, as used with bioreactors, filtration systems, filling systems, and fluid handling systems.

In an aspect, a method of retaining tubing comprises placing cylindrical tubing in the slots in the first end of an aspect of the tubing retainer, sliding the tubing through the narrower portions into the wider portions. Aspects of the method can also include threadably engaging a sensor in the second end of the aspect of the tubing retainer. If desired, the method can comprises engaging the sensor in the second end of the tubing retainer before placing tubing in the slots in the first end of the tubing retainer, or vice versa.

If desired, aspects of the method can include placing the face of the sensor in contact with the cylindrical tubing, or providing a predetermined gap between the face of the sensor and the cylindrical tubing.

In another aspect, a method for sensing a parameter of a fluid (liquid or air) in cylindrical tubing in an aspect of a sensing system comprises passing the fluid through the cylindrical tubing and receiving data regarding the parameter from the sensor.

The following example further illustrates the invention but, of course, should not be construed as in any way limiting its scope.

Example

This example demonstrates a method of retaining tubing according to an aspect of the invention.

A sensing system for use in a bioreactor is set up as generally shown in FIG. 5, wherein a Rechner KAS-80-A14 capacitive sensor (Rechner Industrie-Elektronik Gmbh, Lampertheim, Germany) is threaded in the second end of the retainer. The outside diameter of the tubing is 90 mm, the inside diameter of the wider portions is about 88.5 mm, and the tubing is easily engaged in position. The lower portion of the tubing contacts the face of the sensor.

Protein solution is passed through the tubing, and a programmable logic controller shows a consistent measurement of the passage of the protein solution.

The invention claimed is:

1. A tubing retainer for use with a sensor, comprising
   (a) a hollow polymeric shaft having a first end, a second end, a side wall having a cylindrical inner surface and an outer surface, and a vertical axis;
      (i) the first end having cut outs through opposing portions of the side wall, the cut outs forming first and second slots in the opposing portions of the side wall, the first and second slots collectively arranged to receive cylindrical tubing therein, the first and second slots each having a narrower portion at the first end for initially receiving the cylindrical tubing, and a wider portion below the narrower portion, the wider portion providing a closed end of each of the first and second slots, wherein the wider portion has an inner diameter arranged to retain the cylindrical tubing without significantly compressing the cylindrical tubing;
      (ii) the second end having threads on the inner surface, and a flat base perpendicular to the vertical axis.

2. The tubing retainer of claim 1, wherein the threads on the inner surface of the second end are configured to engage with threads on an outer surface of a sensor;
   wherein when cylindrical tubing is retained in the first end of the tubing retainer and the sensor is threadably engaged in the second end of the tubing retainer, the cylindrical tubing is aligned with an upper end of a sensor.

3. The tubing retainer of claim 1, wherein the inner diameter of the wider portion is equal to an outer diameter of the cylindrical tubing.

4. The tubing retainer of claim 1, wherein the inner diameter of the wider portion is about 5% smaller than an outer diameter of the cylindrical tubing.

5. The tubing retainer of claim 1, wherein when the cylindrical tubing is retained in the first end of the tubing retainer and the sensor is threadably engaged in the second end of the tubing retainer, a distance from the closed ends of the first and second slots to an upper end of the sensor is about 2 cm or less.

6. The tubing retainer of claim 5, wherein when the cylindrical tubing is retained in the first end of the tubing retainer and the sensor is threadably engaged in the second end of the tubing retainer, the top end of the sensor contacts an outer surface of the cylindrical tubing.

7. A sensing system comprising the tubing retainer of claim 1;
   cylindrical tubing retained in the first end of the tubing retainer; and,
   a sensor having an upper end and a lower end, the sensor having an outer surface including threads engageable with the threads on the inner surface of the second end of the tubing retainer.

8. The sensing system of claim 7, wherein the sensor comprises an ultrasonic sensor.

9. The sensing system of claim 7, wherein the sensor comprises a capacitive sensor.

10. A method of retaining cylindrical tubing, the method comprising placing cylindrical tubing in a tubing retainer for use with a sensor, the tubing retainer comprising
    a hollow polymeric shaft having a first end, a second end, a side wall having a cylindrical inner surface and an outer surface, and a vertical axis;
       (i) the first end having cut outs through opposing portions of the side wall, the cut outs forming first and second slots in the opposing portions of the side wall, the first and second slots collectively arranged to receive cylindrical tubing therein, the first and second slots each having a narrower portion at the first end for initially receiving the cylindrical tubing, and a wider portion below the narrower portion, the wider portion providing a closed end of each of the first and second slots, wherein the wider portion has an inner diameter arranged to retain the cylindrical tubing without significantly compressing the cylindrical tubing;
       (ii) the second end having threads on the inner surface, and a flat base perpendicular to the vertical axis; and,
    placing cylindrical tubing in the slots in the first end of the tubing retainer, and sliding the cylindrical tubing through the narrower portions into the wider portions.

11. The method of claim 10, also including threadably engaging a sensor in the second end of the aspect of the tubing retainer.

12. The tubing retainer of claim 2, wherein the inner diameter of the wider portion is equal to an outer diameter of the cylindrical tubing.

13. The tubing retainer of claim 2, wherein the inner diameter of the wider portion is about 5% smaller than an outer diameter of the cylindrical tubing.

14. The tubing retainer of claim 2, wherein when the cylindrical tubing is retained in the first end of the tubing retainer and the sensor is threadably engaged in the second end of the tubing retainer, a distance from the closed ends of the first and second slots to an upper end of the sensor is about 2 cm or less.

15. The tubing retainer of claim 3, wherein when the cylindrical tubing is retained in the first end of the tubing retainer and the sensor is threadably engaged in the second end of the tubing retainer, a distance from the closed ends of the first and second slots to an upper end of the sensor is about 2 cm or less.

16. The tubing retainer of claim 4, wherein when the cylindrical tubing is retained in the first end of the tubing retainer and the sensor is threadably engaged in the second end of the tubing retainer, a distance from the closed ends of the first and second slots to an upper end of the sensor is about 2 cm or less.

17. A sensing system comprising the tubing retainer of claim 2;
    cylindrical tubing retained in the first end of the tubing retainer; and,
    a sensor having an upper end and a lower end, the sensor having an outer surface including threads engageable with the threads on the inner surface of the second end of the tubing retainer.

18. A sensing system comprising the tubing retainer of claim 3;
    cylindrical tubing retained in the first end of the tubing retainer; and, a sensor having an upper end and a lower end, the sensor having an outer surface including threads engageable with the threads on the inner surface of the second end of the tubing retainer.

19. A sensing system comprising the tubing retainer of claim 4;
  cylindrical tubing retained in the first end of the tubing retainer; and,
  a sensor having an upper end and a lower end, the sensor having an outer surface including threads engageable with the threads on the inner surface of the second end of the tubing retainer.

20. A sensing system comprising the tubing retainer of claim 5;
  cylindrical tubing retained in the first end of the tubing retainer; and,
  a sensor having an upper end and a lower end, the sensor having an outer surface including threads engageable with the threads on the inner surface of the second end of the tubing retainer.

* * * * *